Oct. 23, 1923.　　　　　A. M. DEMUTH　　　　　1,471,475
RECEPTACLE FOR REMOVING LIQUIDS FROM VESSELS
Filed July 13, 1922
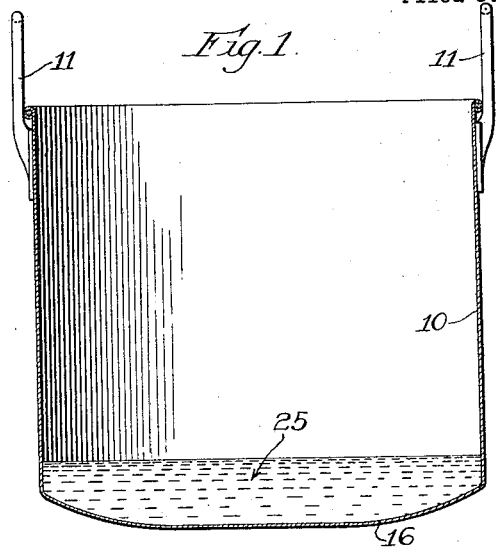
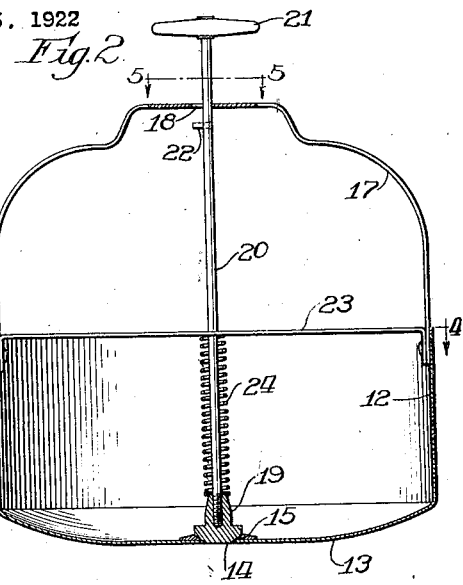
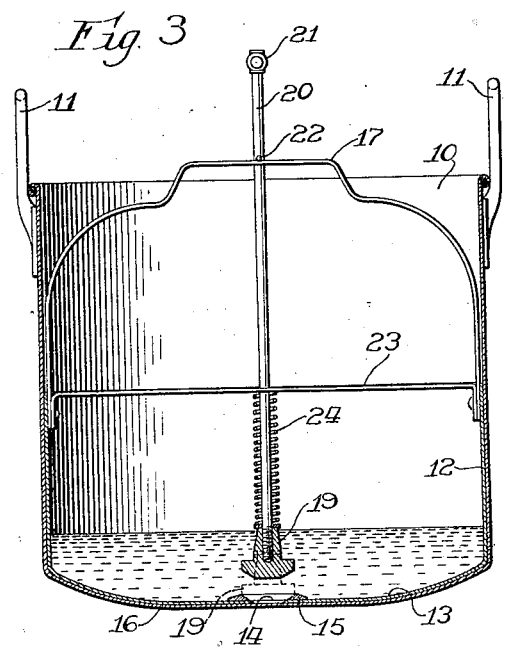
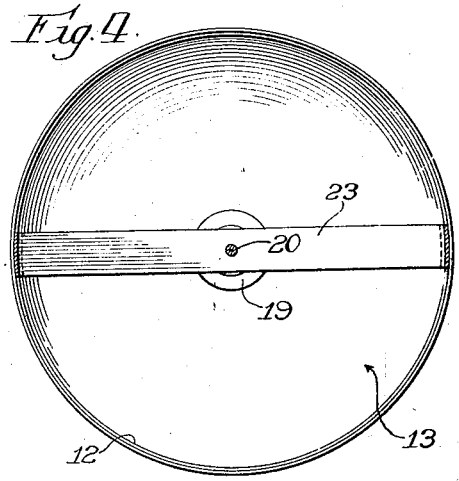
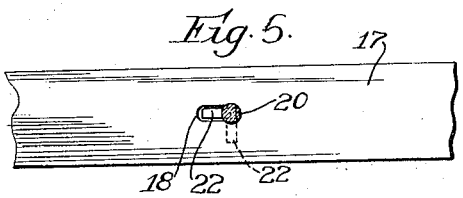
Inventor:
Alfred M. Demuth
By　　　　Atty.

Patented Oct. 23, 1923.

1,471,475

UNITED STATES PATENT OFFICE.

ALFRED M. DEMUTH, OF CHICAGO, ILLINOIS.

RECEPTACLE FOR REMOVING LIQUIDS FROM VESSELS.

Application filed July 13, 1922. Serial No. 574,828.

*To all whom it may concern:*

Be it known that I, ALFRED M. DEMUTH, a citizen of the United States, residing at Chicago, in the county of Cook and State of Illinois, have invented certain new and useful Improvements in Receptacles for Removing Liquids from Vessels, of which the following is a specification.

This invention relates to improvements in receptacles for removing liquids from vessels, particularly adapted, though not necessarily limited in its use with cooking apparatus.

Heretofore the liquids and juices in cooking apparatus have generally been removed therefrom by dipping or bailing them out, which operation is not only troublesome but necessitates considerable time. In the apparatus embodying a draw off or drain pipe for the liquids, leading from the bottom of the cooking container, considerable of the liquids or juices accumulate in the drain pipe before the same is opened to discharge the liquid, and during the cooking operation. This is objectionable especially when cooking articles of food which have a small amount of juice, as the juice will flow into the pipe to accumulate therein and will be retained out of contact with the article during the cooking operation.

To overcome these difficulties and objections and to provide an improved receptacle by means of the use of which the liquids and juices may be all removed from the container at one time and without transporting or tilting the container, is one of the objects of this invention.

A further object is to provide an improved receptacle of this character which will be simple, durable and cheap in construction, so shaped as to fit snugly within and to conform to the contour of the container, and which receptacle is of such a weight that when placed within the container it will gravitate to the bottom of the container and into which receptacle the liquids and juices will flow during the gravitation of the receptacle.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention and in which Figure 1 is a vertical sectional view of a vessel with which this improved receptacle is adapted to be used.

Figure 2 is a view partly in vertical section and partly in elevation of the receptacle showing the valve closed.

Figure 3 is a vertical sectional view showing the receptacle within the container and with the juices removed from the vessel and within the receptacle.

Figure 4 is a sectional view taken on line 4—4, Figure 2.

Figure 5 is a sectional view taken on line 5—5, Figure 2.

Referring more particularly to the drawing the numeral 10 designates generally a cooking vessel which may, if desired, be provided with suitable handles 11.

The numeral 12 designates a receptacle which is comparatively shallow, the bottom 13 thereof being provided with an opening 14 therein, having a valve seat 15 arranged about the opening.

The receptacle 12 is of a size and shape to fit snugly within the vessel 10 to conform to the contour thereof and the bottom 13 of the receptacle is shaped to conform to the contour of the bottom 16 of the vessel 10.

The receptacle 12 is preferably provided with a bail like guide 17 which also may serve as a handle and is provided with an opening therethrough and which opening is provided with a laterally extending portion 18, preferably reduced in diameter.

A valve 19 is provided for closing the opening 14 in the bottom 13 of the receptacle and this valve 19 co-operates with the valve seat 15 to close the opening 14.

The valve is provided with a stem 20 which projects through the opening in the portion 17 and the stem 20 preferably terminates in a handle 21, disposed above the portion 17.

Carried by the stem 20 is a lateral projection 22 which is adapted to be moved through the opening 18 in the guide and portion 17 and when the projection 22 is in a position above the portion 17, the stem 20 may be rotated so as to move the projection 22 out of alinement with the portion 18 of the opening in the portion 17 so as to lock or maintain the valve 19 in an open position. When it is desired to close the opening 14 the stem 20 is rotated by the handle 21 to position the projection 22 so that it will pass through the opening 18.

An additional guide 23 may also be provided and through which the stem passes and disposed between the guide 23 and the valve 19 is an elastic element 24 preferably in the form of a spring coiled about the stem 20, one end of the spring abutting the guide 23 and the other end abutting the valve 19. The stress of this spring 20 is such that it tends normally to seat the valve 19 and when the valve 19 is opened by moving the stem 20 longitudinally, the spring 24 will be compressed but when the handle 21 is released and the projection 22 positioned above the opening 18 the spring 24 will close the valve 19.

In operation and when it is desired to remove the contents of the vessel 10, the valve 19 is opened and positioned as shown in full lines in Figure 3. The receptacle may then be placed within the vessel 10, the weight of the receptacle being preferably such that it will gravitate to the bottom of the vessel 10, during which time the liquid 25 in the vessel 10 will flow through the opening 14 and into the receptacle 12.

Inasmuch as the receptacle 12 and bottom 13 thereof conform to the contour of the vessel 10 and bottom 16 thereof, all of the liquid will be displaced when the receptacle 12 is placed within the vessel 10, and the liquid will flow into the receptacle 12. The valve 19 may be then closed by rotating the handle 21 so as to permit the valve to assume the position shown in dotted lines in Figure 3. All of the liquid being now within the receptacle 12, the latter may be removed from the vessel 10.

With this improved construction it will be manifest that the liquid may be quickly and readily removed from the vessel 10 without necessitating transporting the vessel 10 or tilting the same to empty the contents thereof.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. In combination, a vessel, a receptacle adapted to snugly fit within the said vessel and conforming to the contour thereof, there being an opening in the bottom of the receptacle, a valve for closing the said opening, a stem connected with the valve, a handle on the stem, a guide through which the stem freely slides, and means on the stem and co-operating with the guide for locking the valve in an open position.

2. In combination, a vessel, a receptacle adapted to snugly fit within said vessel and conforming to the contour thereof, there being an opening in the bottom of the receptacle, a valve for closing the opening, a stem and handle connected with the valve, a guide through which the stem passes, a spring disposed between the valve and guide and tending normally to move the valve in a direction to close the said opening, the said valve being adapted to be opened against the stress of the said spring, and locking means for maintaining the valve in an open position and against the stress of said spring.

3. In combination, a vessel, a receptacle adapted to snugly fit within said vessel and conforming to the contour thereof, there being an opening in the bottom of the receptacle, a valve for closing the opening, a stem and handle connected with the valve, a guide through which the stem passes, a spring disposed between the valve and guide and tending normally to move the valve in a direction to close the said opening, and means for maintaining the valve in an open position, the said means embodying separable interengaging means between the stem and guide.

4. In combination, a vessel, a receptacle adapted to snugly fit within and conform to the contour thereof, a bail like handle connected with the receptacle, there being an opening in the bottom of the receptacle, a fixed guide, a portion of the guide being spaced from the handle, a valve for closing the opening, a stem on the valve, said stem being reciprocable through said handle and guide, a handle on the stem, a spring operating upon the valve and tending normally to move the valve in a direction to close the opening, and means on the stem adapted to detachably engage a portion of the first recited handle for securing the valve in an open position and against the stress of the said spring.

5. As an article of manufacture, a pan like receptacle having an opening in the bottom thereof, a bail like handle for the receptacle, a closure for the opening, a stem on the closure, a handle on the stem, a spring, a fixed stop, one portion of the spring engaging said fixed stop and another portion operating upon the closure and tending normally to move the closure in a direction to close the said opening, there being an opening in the first recited handle, and a projection on the said stem adapted to pass through the said opening, said stem being rotatable to move the said projection out of alignment with the said bail like handle to hold the said closure open against the stress of the said spring.

In testimony whereof I have signed my name to this specification on this 10th day of July, A. D. 1922.

ALFRED M. DEMUTH.